July 2, 1946. R. BECK 2,403,256
DIFFERENTIAL PRESSURE GAUGE
Filed July 23, 1943 2 Sheets-Sheet 2
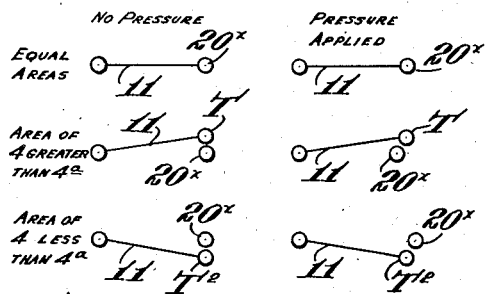
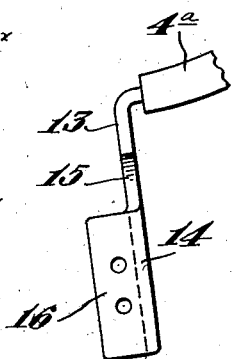
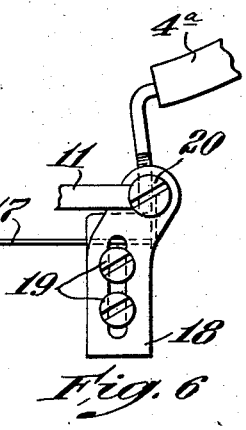
Fig. 4  Fig. 5  Fig. 6
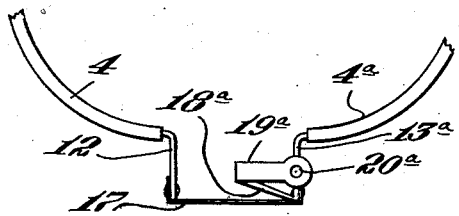
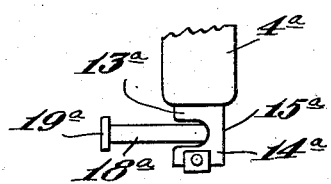
Fig. 7  Fig. 8
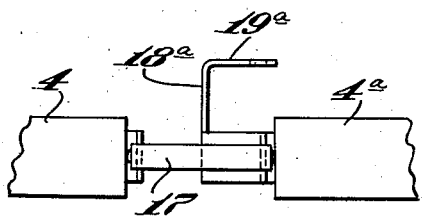
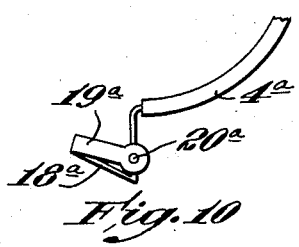
Fig. 9  Fig. 10
Inventor
Rudolf Beck
By Roberts Cushman Woodberry
Attys.

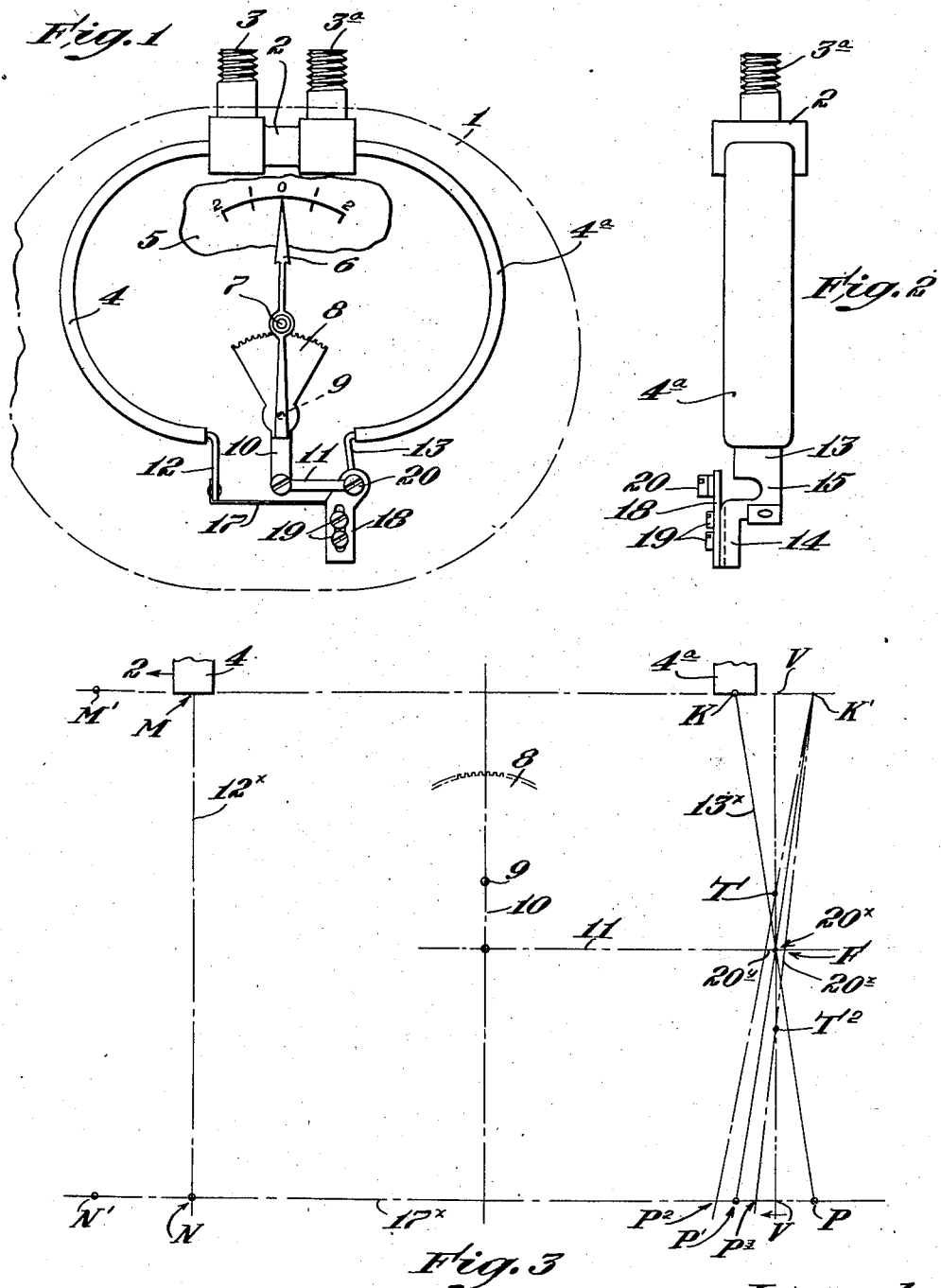

Patented July 2, 1946

2,403,256

UNITED STATES PATENT OFFICE 2,403,256

DIFFERENTIAL PRESSURE GAUGE

Rudolf Beck, Fairfield, Conn., assignor to Manning, Maxwell & Moore, Incorporated, New York, N. Y., a corporation of New Jersey Application July 23, 1943, Serial No. 495,872

10 Claims. (Cl. 73—412)

This invention pertains to differential pressure gauges or similar instruments wherein two motor elements, for example, Bourdon tubes, respond to different pressures, respectively, and by their conjoint action actuate a movable pointer or other index means. Specifically the invention concerns such differential instruments wherein the motor elements are directly opposed to each other.

In instruments of this specific type it is requisite that when both motor elements are subjected to equal static pressure (throughout the entire range of the instrument) they must respond to equal extents (or must be compensated) so that under such equal pressure conditions the index will indicate the zero graduation of the scale. Theoretically, by making the two motor elements exactly alike, such a condition might be obtained. As a practical commercial matter it is impossible to make two such motor elements, for instance Bourdon tubes, diaphragms, metal bellows, etc., so nearly alike in all particulars as to effect this result. Accordingly, resort must be had to the provision of some means for compensating the slight differences in areas, resiliency, etc., of the commercially practical motor elements.

The principal object of the present invention is to provide simple means whereby to compensate for inequalities in the two motor elements thereby to insure a zero reading of the instrument whenever equal static pressures are imposed upon the two motor elements. A further object is to provide means for so adjusting the connections whereby motion is transmitted from the motor elements to the index as to effect the above desired result. Other and further objects and advantages of the invention will be pointed out in the following more detailed description and by reference to the accompanying drawings, wherein Fig. 1 is a front elevation of a differential pressure gauge with certain parts broken away and certain parts removed;

Fig. 2 is an edge elevation showing one of the Bourdon tubes and the bracket attached to its free end, and certain connections which lead from the bracket to the movement mechanism;

Fig. 3 is a large scale diagram illustrating the principle of the invention;

Fig. 4 is a diagram illustrating various settings of the instrument;

Fig. 5 is a fragmentary front elevation to larger scale than Fig. 1 showing the free end of one of the Bourdon tubes and the bracket member which is mounted thereon;

Fig. 6 is a view similar to Fig. 5 but showing additional parts;

Fig. 7 is a fragmentary view illustrating a modified construction showing the tip portions of the Bourdon tubes and a part of the connecting means for transmitting motion to the movement mechanism;

Fig. 8 is a fragmentary side elevation of the parts shown in Fig. 7;

Fig. 9 is a bottom view of the parts shown in Fig. 7; and

Fig. 10 is a fragmentary view similar to Fig. 7 but showing the parts in another position.

Referring to the drawings, the numeral 1 designates the case of the instrument which may be of conventional type and which is mounted upon a bracket 2 having a pair of stem members 3 and 3ª, respectively, designed to be secured to a pair of pressure transmitting pipes (not shown) the stem members 3 and 3ª communicating with opposed pressure motors, here specifically illustrated as the oppositely curved Bourdon tubes 4 and 4ª whose fixed ends are secured to the bracket 2 and whose free ends are spaced apart and arranged to move in opposite directions in response to increase in fluid pressure in the two tubes. The instrument includes a graduated dial 5 with which a movable index or pointer 6 cooperates, the index being mounted upon a staff 7 which is turned in one direction or the other by a gear segment 8 mounted on one arm of a lever pivoted at 9 and having a second arm or tail member 10 to which is connected one end of a link 11.

In accordance with the present invention, the free end or tip of the Bourdon tube 4 is provided with a rigid elongate bracket 12 (Fig. 1) while the free end or tip of the other Bourdon tube 4ª is provided with a bracket 13 (Fig. 5) which is so constructed that its outer end may move substantially in the plane of movement of the Bourdon tubes but in an arc different from the arc of movement of the tube tip. Obviously the brackets 12 and 13 move bodily toward and away from each other in response to varying fluid pressures within the tubes 4 and 4ª, and the brackets are connected to and actuate the compensating motion-transmitting means for moving the index or pointer as hereinabout to be described. For convenience in description the brackets are hereinafter referred to as actuating elements. As here illustrated (Figs. 2 and 5) the bracket or actuator 13 comprises a substantially rigid upper portion and a substantially rigid lower portion 14, said portions being united by a relatively flexible portion 15 providing a point of flexure about which the part 14 may swing. The part 14 is provided with a rigid, vertically elongate transversely extending guide portion 16 (Fig. 5) having screw threaded apertures therein and which constitutes a guide for an adjustable drive element 18 (Figs. 1 and 6) which is slotted for the reception of screws 19 by means of which it may be fixed in adjusted position with reference to the guide member 16. The parts are so arranged that the member 18 may be adjusted in a direction generally perpendicular to the length of a flexible but substantially inextensible link 17 which connects the free end of the rigid bracket 12 to the rigid lower portion 14 of the bracket carried by the tube 4ª. The link 17 need not be flexible throughout its entire length providing that it is flexible adjacent to its connection to parts 12 and 14, respectively. At its upper end the drive element 18 is provided with a threaded opening for the reception of a pivot screw 20 to which the right-hand end of the link 11 is attached. It is thus possible by adjustment of the part 18 to move the pivotal axis of the pin 20 in a generally vertical direction.

In a modified construction illustrated in Figs. 7 to 10, inclusive, the free end portion of the Bourdon tube 4ª is provided with a bracket comprising the rigid upper part 13ª, the lower part 14ª and the flexible intermediate part 15ª. In this instance, however, the drive element 18ª comprises a stiffly bendable arm fixedly secured at one end to the part 14ª and which has an extension 19ª provided with a threaded opening at its free end at 20ª for the reception of the pivot screw which connects it to the link 11. In this arrangement, the adjustment of the axis of the pivot screw (that is to say, the adjustment of the screw threaded opening 20ª, in a vertical direction) is obtained by bending the material of the part 18ª. While such bending results in causing the opening 20ª to move in an arcuate path instead of a rectilinear path the amount of such movement is so small that the curvature of the path is of no consequence.

The principle of operation is illustrated in Fig. 3, wherein the tips of the two Bourdon tubes 4 and 4ª are indicated. The lines 12ˣ and 13ˣ diagrammatically indicate the brackets carried by the respective tube tips. The line 17ˣ represents the link 17 which connects the free ends of the brackets, and the point 20ˣ represents the pivotal axis where one end of the link 11 is connected to the bracket 13ˣ. The other end of link 11 is connected to the lower end of the tail 10 of the segment lever which turns about the pivot point 9 and actuates the segment 8.

If it be assumed that the two Bourdon tubes are exactly alike so that their tips move to exactly the same amount when the two tubes are subjected to equal pressures, then if equal pressures are imposed upon the two tubes, the tip of the tube 4 may be assumed to move from the point M to the point M' the lower end of the bracket 12ˣ moving similarly from the point N to the point N'. At the same time, the tube tip 4ª will move to the right from the point K to the point K', the distances M—M' and K—K' being equal. However, since the bracket 12ˣ is rigid and the link 17ˣ is inextensible, while the bracket 13ˣ is flexible, the lower end of the bracket 13ˣ will move from the point P to the point P' where P—P'=N—N'. It will be observed that although the tube tips have moved in opposite directions, the point 20ˣ remains stationary, since the lower end of the bracket 13ˣ has moved to the left to exactly the same amount that its upper end has moved to the right. Thus, on the assumption that the two tubes are exactly alike in every respect, the application of equal static pressures to the two tubes will not move link 11 or affect the position of the pointer or index which will still remain at the zero point of the scale.

The two tubes of such an instrument are seldom, if ever, exactly equal and so they do not actually respond equally to equal static pressures. For example, if the tube 4 be of somewhat larger cross sectional area than the tube 4ª, then when the two tubes are subjected to equal static pressures the tube 4 may be expected to move further to the left than in the preceding instance, thus pulling the lower end of the bracket 13ˣ further to the left, that is to say for example to the point P². This would result in moving the point 20ˣ to a point 20ʸ on a line connecting the point K' with the point P². This would cause a movement of the index away from the zero point of the scale. However, if the point at which the link 11 is united to the bracket 13ˣ, be shifted upwardly from 20ˣ to the point T, where the line K'—P² intersects the vertical line through the point 20ˣ, then such unequal movement of the two tube tips will not affect the position of the pointer, which will still remain at the zero of the scale.

On the other hand, if the tube 4 be of lesser transverse area than the tube 4ª, than when subjected to equal pressures the lower end of the bracket 13ˣ will not be moved so far to the left as if the tubes were alike, for example, it may be moved to the point P³. This would result in shifting point 20ˣ to the right, to a point 20ᶻ on the line joining the points K' and P³. If, however, the pivotal connection between the link 11 and the bracket 13ˣ be shifted from 20ˣ downwardly to the point T² at the intersection of the vertical line through the point 20ˣ and the line K'—P³, then upon the application of equal static pressures to the two tubes, the link 11 will not be moved and the pointer will still remain at the zero position.

In Fig. 4 the relative positions of the points 20ˣ, T and T² under various conditions are illustrated in self-explanatory ways so that further description of the operation appears unnecessary.

While certain desirable embodiments of the invention have been illustrated and described by way of example it is to be understood that the invention is not necessarily limited to these precise embodiments but is to be regarded as broadly inclusive of all equivalent constructions falling within the terms of the appended claims.

I claim:

1. A differential pressure gauge comprising a pair of Bourdon tubes so relatively arranged that their free ends tend to move in opposite directions in response to fluid pressure, a rigid bracket secured to the free end of one tube, a bracket secured to the free end of the other tube, said latter bracket comprising substantially rigid end portions united by a flexible connection such that the free end portion of the latter bracket may swing in the plane of movement of the tube tip but in an arc different from that traversed by the tube tip, a substantially inextensible link connecting the free end portions of the two brackets, a movable index, and means for transmitting motion from the tubes to the index comprising a drive element mounted on the free end portion of the flexible bracket, said drive element being adjustable in a direction substantially perpendicular to the length of the link.

2. A differential dial instrument comprising a pair of opposed Bourdon tubes whose free ends are arranged to move in opposite directions in response to increase in pressure, a bracket secured to the free end of each tube, one bracket being rigid and the other including inner and outer parts united by a flexible connection, the inner part being fixed to the tube, a substantially inextensible but flexible link uniting the outer end portions of the two brackets, a support rigidly united to the outer portion of the second bracket, a drive element slidably mounted on said support so as to move in a path substantially perpendicular to the length of the link, means for holding the drive element in adjusted position relatively to the support, a movable index, and means for transmitting motion from the drive element to the index.

3. A differential pressure gauge comprising a pair of opposed pressure motors, each provided with an elongate actuator which is moved by the respective motor in response to pressure variations, one of said actuators being substantially rigid and the other comprising an intermediate portion which is resiliently flexible, a movable drive element, connections for transmitting motion from each of said actuators to the drive element whereby the latter is moved by the conjoint action of the two motors, a movable index, and connections for transmitting motion from the drive element to the index, said drive element being adjustable longitudinally of the latter of said actuators whereby to compensate for differences in response of the pressure motors to equal static pressures.

4. A differential pressure gauge comprising a pair of opposed pressure motors including elongate actuators which tend to move in opposite directions respectively in response to increase in fluid pressure, a substantially inextensible link connecting said actuators, one of said actuators being substantially rigid and the other having a flexible portion intermediate its ends, a drive element secured to the free end of the latter of said actuators and which moves in response to the conjoint action of the motors, a movable index, and connections for transmitting motion from the drive element to the index, said drive element being adjustable relatively to the latter of said actuators whereby it may be so initially located as to compensate for differences in response of the respective motors to equal static pressures.

5. A differential pressure gauge comprising a pair of opposed pressure motors including elongate actuators which tend to move in opposite directions respectively in response to increase in fluid pressure, one of said actuators being rigid and the other being flexible, means including an inextensible, flexible link united at opposite ends to the respective actuators and which is substantially perpendicular to said actuators, a drive element connected to the free end of the flexible actuator, a movable index, and connections for transmitting motion from the drive element to the index, the drive element being adjustable relatively to the flexible actuator in a direction substantially perpendicular to the length of the link so that it may be initially located to compensate for differences in response of the two motors to equal static pressures.

6. A differential pressure gauge comprising a pair of opposed pressure motors including parts which tend to move in opposite directions respectively in response to increase in fluid pressure, a rigid elongate actuator attached to one of said movable parts, an elongate actuator rigidly attached at one end to the other of said movable parts, said latter actuator having a flexible portion intermediate its ends, said actuators being normally substantially parallel, a substantially inextensible flexible link connected at one end to the free end of said latter actuator and at its other end to the free end of the rigid actuator, the link being substantially perpendicular to the actuators, a drive element mounted on the free end of that actuator having the flexible intermediate portion, a movable index, and connections for transmitting motion from the drive element to the index, the drive element being adjustable relatively to the actuator which has the flexible intermediate portion in a direction substantially perpendicular to the length of the flexible link thereby to compensate for differences in response of the two motors to equal static pressures.

7. A differential pressure gauge comprising a pair of Bourdon tubes so relatively arranged that their free ends tend to move in opposite directions in response to increase in fluid pressure, an elongate bracket secured at one of its ends to the movable end of each tube, one of said brackets being rigid and the other having a flexible portion intermediate its ends, means so connecting the free ends of the brackets that said ends are constrained to move in unison and to the same extent, a drive element adjustably mounted on the free end portion of the bracket having the flexible portion so that it may be initially set relatively to the latter bracket so as to compensate for different response of the two Bourdon tubes to equal static pressures, an index, and connections for transmitting motion from the drive element to the index.

8. A differential dial instrument comprising a pair of opposed Bourdon tubes whose free ends are arranged to move in opposite directions in response to increase in pressure, a bracket secured to the free end of each tube, one bracket being rigid and the other including inner and outer parts united by a flexible portion, the inner part being fixed to the respective tube, a substantially inextensible but flexible link uniting the outer end portions of the two brackets, a drive element fixed to the free outer end of the bracket having the flexible portion, a movable index, and means connected to the drive element for transmitting motion from the drive element to the index, the drive element comprising a stiffly bendable portion thereby to permit the point at which the motion-transmitting means is connected to the drive element to be adjusted relatively to the adjacent bracket along a path substantially perpendicular to the length of the link.

9. A differential dial instrument comprising a pair of opposed Bourdon tubes having their free ends so disposed that they tend to move in opposite directions in response to increase in fluid pressure, substantially parallel actuators attached to the free ends of the respective tubes, one of said actuators being rigid and the other having a flexible portion intermediate its ends, a substantially inextensible element connecting the free ends of the two actuators, a movable index, a drive element carried by the free end of the actuator having the flexible intermediate portion, the drive element being so constructed and arranged that it may be adjusted relatively to the actuator upon which it is mounted in a direction substantially perpendicular to a line connecting the tube tips thereby to compensate for different responses of the free ends of the two tubes respectively when they are subjected to equal static pressures, and means for transmitting movement from the drive element to the index.

10. A differential dial instrument comprising a pair of opposed Bourdon tubes having their free ends arranged to move in opposite directions in response to increase in fluid pressure, a rigid bracket attached to the tip of one tube and a bracket attached to the tip of the other tube, the latter bracket having a flexible portion intermediate its ends, a substantially inextensible link connecting the free ends of said brackets thereby to constrain said bracket ends to move in unison and to the same extent, a movable index, a drive element, means adjustably securing the drive element to the free end of the bracket which has the flexible portion so that it may be moved in a path substantially perpendicular to the length of the link thereby to compensate for different responses of the free ends of the two tubes when they are subjected to equal static pressures, and connections for transmitting motion from the drive element to the index.

RUDOLF BECK.